United States Patent
Sambo et al.

(10) Patent No.: US 11,798,281 B2
(45) Date of Patent: *Oct. 24, 2023

(54) SYSTEMS AND METHODS FOR UTILIZING MACHINE LEARNING MODELS TO RECONSTRUCT A VEHICLE ACCIDENT SCENE FROM VIDEO

(71) Applicant: Verizon Connect Development Limited, Dublin (IE)

(72) Inventors: Francesco Sambo, Florence (IT); Leonardo Taccari, Florence (IT); Marco Boschi, Ravenna (IT); Luca De Luigi, Bologna (IT); Samuele Salti, Prato (IT)

(73) Assignee: Verizon Connect Development Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,003

(22) Filed: Jun. 30, 2022

(65) Prior Publication Data
US 2022/0327833 A1    Oct. 13, 2022

Related U.S. Application Data

(63) Continuation of application No. 16/947,495, filed on Aug. 4, 2020, now Pat. No. 11,403,851.

(51) Int. Cl.
*G06V 20/40*      (2022.01)
*G06T 7/20*       (2017.01)
(Continued)

(52) U.S. Cl.
CPC .............. *G06V 20/46* (2022.01); *G06T 7/20* (2013.01); *G06T 17/20* (2013.01); *G07C 5/008* (2013.01);
(Continued)

(58) Field of Classification Search
USPC ....................................................... 382/104
See application file for complete search history.

(56) References Cited

U.S. PATENT DOCUMENTS 8,620,518 B2    12/2013   Bradley et al.
9,886,841 B1     2/2018   Nave et al.
(Continued)

FOREIGN PATENT DOCUMENTS

CN    201628999    11/2010
CN    107194989     9/2017

OTHER PUBLICATIONS

"CNN-DSO: A combination of Direct Sparse Odometry and CNN Depth Prediction", GitHub, Feb. 13, 2019, 2 Pages.
(Continued)

*Primary Examiner* — Ishrat I Sherali

(57) ABSTRACT

A device may receive, from a first vehicle, video data for video captured of a location associated with an accident for a second vehicle, and may process the video data, with a first model, to generate a sparse point cloud of the location associated with the accident. The device may process the video data, with a second model, to generate depth maps for frames of the video data, and may utilize the depth maps with the sparse point cloud to generate a dense point cloud. The device may process the video data, with a third model, to generate a dense semantic point cloud, and may process the dense semantic point cloud, with a fourth model, to determine a dense semantic overhead view of the location associated with the accident. The device may perform actions based on the dense semantic overhead view.

20 Claims, 14 Drawing Sheets

(51) Int. Cl.
*G06T 17/20* (2006.01)
*G07C 5/00* (2006.01)
*G08G 1/00* (2006.01)

(52) U.S. Cl.
CPC .......... *G08G 1/205* (2013.01); *G06T 2200/04* (2013.01); *G06T 2207/20084* (2013.01); *G06T 2207/30252* (2013.01); *G06T 2210/12* (2013.01); *G06V 2201/07* (2022.01)

(56) References Cited

U.S. PATENT DOCUMENTS

| | | | | |
|---|---|---|---|---|
| 10,145,684 | B1 * | 12/2018 | Tofte | H04N 7/185 |
| 10,997,800 | B1 | 5/2021 | Salodkar et al. | |
| 11,403,851 | B2 * | 8/2022 | Sambo | G06V 20/46 |
| 11,562,436 | B2 * | 1/2023 | Seth | G06Q 40/08 |
| 2020/0027333 | A1 | 1/2020 | Xu et al. | |
| 2021/0304592 | A1 | 9/2021 | Lepp et al. | |

OTHER PUBLICATIONS

"Open Source Routing Engine for OpenStreetMap", GitHub, Website: https://valhalla.readthedocs.io, 2015, 5 Pages.
Chen, et al., "Encoder-Decoder with Atrous Separable Convolution for Semantic Image Segmentation", Computer Vision Foundation, Website: https://link.springer.com/conference/eccv, 2018, 18 Pages.
Engel, et al., "Direct Sparse Odometry", IEEE Transactions on Pattern Analysis and Machine Intelligence, vol. 40, No. 3, Mar. 2018, pp. 611-625.
Godard, et al., "Unsupervised Monocular Depth Estimation with Left-Right Consistency", University College London, Website: http://visual.cs.ucl.ac.uk/pubs/monoDepth/, Sep. 13, 2016, pp. 270-279.
Redmon, et al., "YOLOv3: An Incremental Improvement", Website: https://pjreddie.com/yolo/, Apr. 8, 2018, 6 Pages.
Ren, et al., "Faster R-CNN: Towards Real-Time Object Detection with Region Proposal Networks", https://doi.org/10.48550/arXiv.1506.01497, Jan. 6, 2016, 14 Pages.

* cited by examiner

SYSTEMS AND METHODS FOR UTILIZING MACHINE LEARNING MODELS TO RECONSTRUCT A VEHICLE ACCIDENT SCENE FROM VIDEO

RELATED APPLICATION

This application is a continuation of U.S. patent application Ser. No. 16/947,495, entitled "SYSTEMS AND METHODS FOR UTILIZING MACHINE LEARNING MODELS TO RECONSTRUCT A VEHICLE ACCIDENT SCENE FROM VIDEO," filed Aug. 4, 2020, which is incorporated herein by reference in its entirety.

BACKGROUND

Dashboard cameras have seen increased use in popularity over the last few years. In the context of fleet management, they provide first evidence in accidents and valuable context to understand driver behavior, decrease liability, improve safety, and provide personalized coaching.

DETAILED DESCRIPTION OF PREFERRED EMBODIMENTS

Figure 1A:
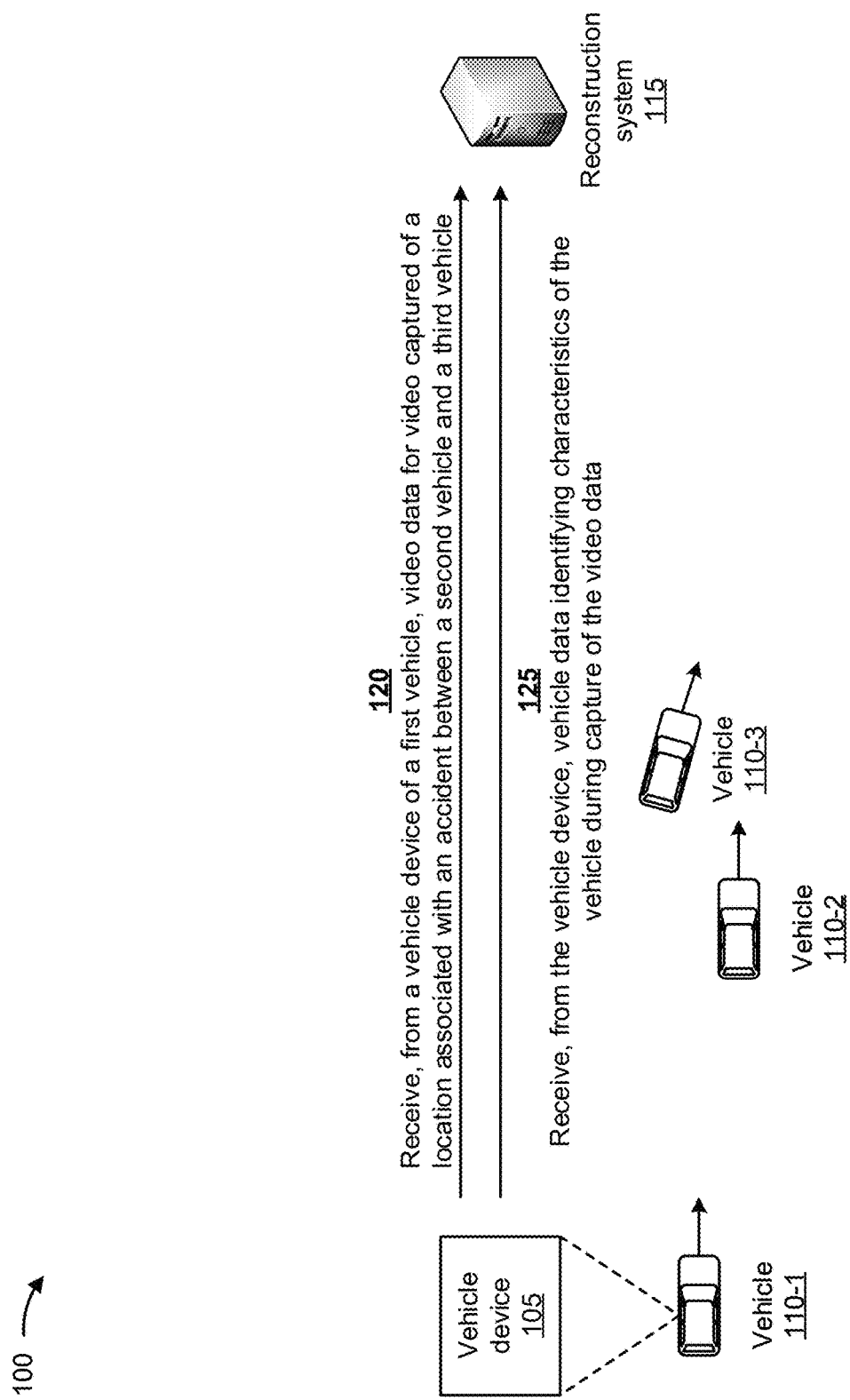
FIGS. 1A-1J are diagrams of one or more example implementations described herein.

The following detailed description of example implementations refers to the accompanying drawings. The same reference numbers in different drawings may identify the same or similar elements.

Current techniques for reconstructing a vehicle accident scene and/or identifying vehicle operation that potentially causes a vehicle accident is time consuming and expensive. Vehicle accident reconstruction may include investigating, analyzing, and drawing conclusions about causes and events during a vehicle accident. Current techniques typically require accident analysis and reconstruction to identify a cause of an accident and contributing factors, such as roles of vehicle drivers, vehicles, roadway, general environment, and/or the like. Current techniques also require visiting the accident scene and investigating the vehicles involved in the accident. Investigations involve collecting evidence, such as scene photographs, video of the accident, measurements of the scene, eyewitness testimony, legal depositions, steering angles, braking, use of lights, turn signals, speed, acceleration, and/or the like. Thus, current techniques for reconstructing a vehicle accident scene waste computing resources (e.g., processing resources, memory resources, communication resources, and/or the like), networking resources, transportation resources, human resources, and/or the like associated with collecting various vehicle accident scene evidence, analyzing the evidence, drawing conclusions based on analyzing the evidence, and/or the like.

Some implementations described herein provide a reconstruction system that utilizes machine learning and other models to reconstruct a vehicle accident scene from video. For example, the reconstruction system may receive, from a vehicle device of a first vehicle, video data for video captured of a location associated with an accident associated with a second vehicle, and may process the video data, with a first model (e.g., a simultaneous localization and mapping (SLAM) model, such as a direct sparse odometry (DSO) SLAM model), to generate a sparse point cloud of the location associated with the accident. The reconstruction system may process the video data, with a second model (e.g., a convolutional neural network model), to generate depth maps for frames of the video data, and may utilize the depth maps with the sparse point cloud to generate a dense point cloud. The reconstruction system may process the video data, with a third model (e.g., a semantic segmentation model), to generate a dense semantic point cloud, and may process the dense semantic point cloud, with a fourth model (e.g., a voxelization model), to determine a dense semantic overhead view (e.g., a bird's eye view or BEV) of the location associated with the accident. The reconstruction system may project bounding boxes (e.g., generated based on object detection and object tracking models) of the second vehicle onto the dense semantic overhead view to provide a trajectory of the second vehicle in the dense semantic overhead view, and may augment the dense semantic overhead view with the trajectory of the second vehicle, with additional data to generate a final overhead view. The reconstruction system may perform one or more actions based on the final overhead view.

In this way, the reconstruction system utilizes machine learning and other models to reconstruct a vehicle accident scene from video. The reconstruction system may automatically reconstruct the vehicle accident scene based on data received from a vehicle tracking unit and/or a dashboard camera, such as video footage of the vehicle accident scene, location data and vehicle speeds at multiple positions of the vehicle accident scene, inertial measuring unit data, and/or the like. The reconstruction system may analyze the data and may generate an overhead view (e.g., a bird's eye view) of dynamics of the vehicle accident, including trajectories of vehicles involved in the accident, speeds and distances of the vehicles before and during the accident, and/or the like. Thus, the reconstruction system conserves computing resources, networking resources, transportation resources, human resources, and/or the like that would otherwise have been wasted in collecting various vehicle accident scene evidence, analyzing the evidence, drawing conclusions based on analyzing the evidence, and/or the like.

FIGS. 1A-1J are diagrams of one or more example implementations 100 associated with utilizing machine learning models to reconstruct a vehicle accident scene from video. As shown in FIGS. 1A-1J, example implementations 100 include a vehicle device 105, a first vehicle 110-1, a second vehicle 110-2, a third vehicle 110-3 (collectively referred to as vehicles 110, or singularly as vehicle 110), and a reconstruction system 115. Vehicle device 105 may include a device (e.g., a dash camera, a parking assist camera, a backup assist camera, vehicle tracking unit, an accelerometer, and/or the like) that captures video data and/or vehicle data associated with the first vehicle 110-1. Vehicle 110 may include a manual vehicle, an autonomous vehicle, or a semi-autonomous vehicle. Reconstruction system 115 may include a system that utilizes machine learning and other models to reconstruct a vehicle accident scene from video.

As further shown in FIG. 1A, and by reference number 120, reconstruction system 115 may receive, from vehicle device 105 of the first vehicle 110-1, video data for video captured of a location associated with an accident between the second vehicle 110-2 and the third vehicle 110-3. In some implementations, the video data includes video captured of an accident between the second vehicle 110-2 and the third vehicle 110-3, a near-miss accident between the second vehicle 110-2 and the third vehicle 110-3, poor driving behavior (e.g., speeding, swerving, aggressive driving, tailgating, and/or the like) associated with the second vehicle 110-2 and/or the third vehicle 110-3, identification data of the second vehicle 110-2 and/or the third vehicle 110-3 (e.g., a vehicle make, a vehicle model, a license plate number, and/or the like), and/or the like. The video may include multiple frames (e.g., images) that capture the location over a particular time period (e.g., before, during, and after the accident between the second vehicle 110-2 and the third vehicle 110-3). In some implementations, the video data may include video of the location that is captured by the second vehicle 110-2, by the third vehicle 110-3, by cameras at the location, by traffic cameras, and/or the like.

As further shown in FIG. 1A, and by reference number 125, reconstruction system 115 may receive, from vehicle device 105, vehicle data identifying characteristics of the first vehicle 110-1 during capture of the video data. The vehicle data may include data identifying global navigation satellite system (GNSS) coordinates (e.g., global position system (GPS) coordinates) associated with the location, GNSS coordinates of vehicles 110 during the accident, accelerometer data of the first vehicle 110-1 during the accident, gyroscope data of the first vehicle 110-1 during the accident, braking data associated with the first vehicle 110-1 during the accident, and/or the like. In some implementations, the vehicle data includes similar data captured from the second vehicle 110-2 and the third vehicle 110-3, when available.

Figure 1B:
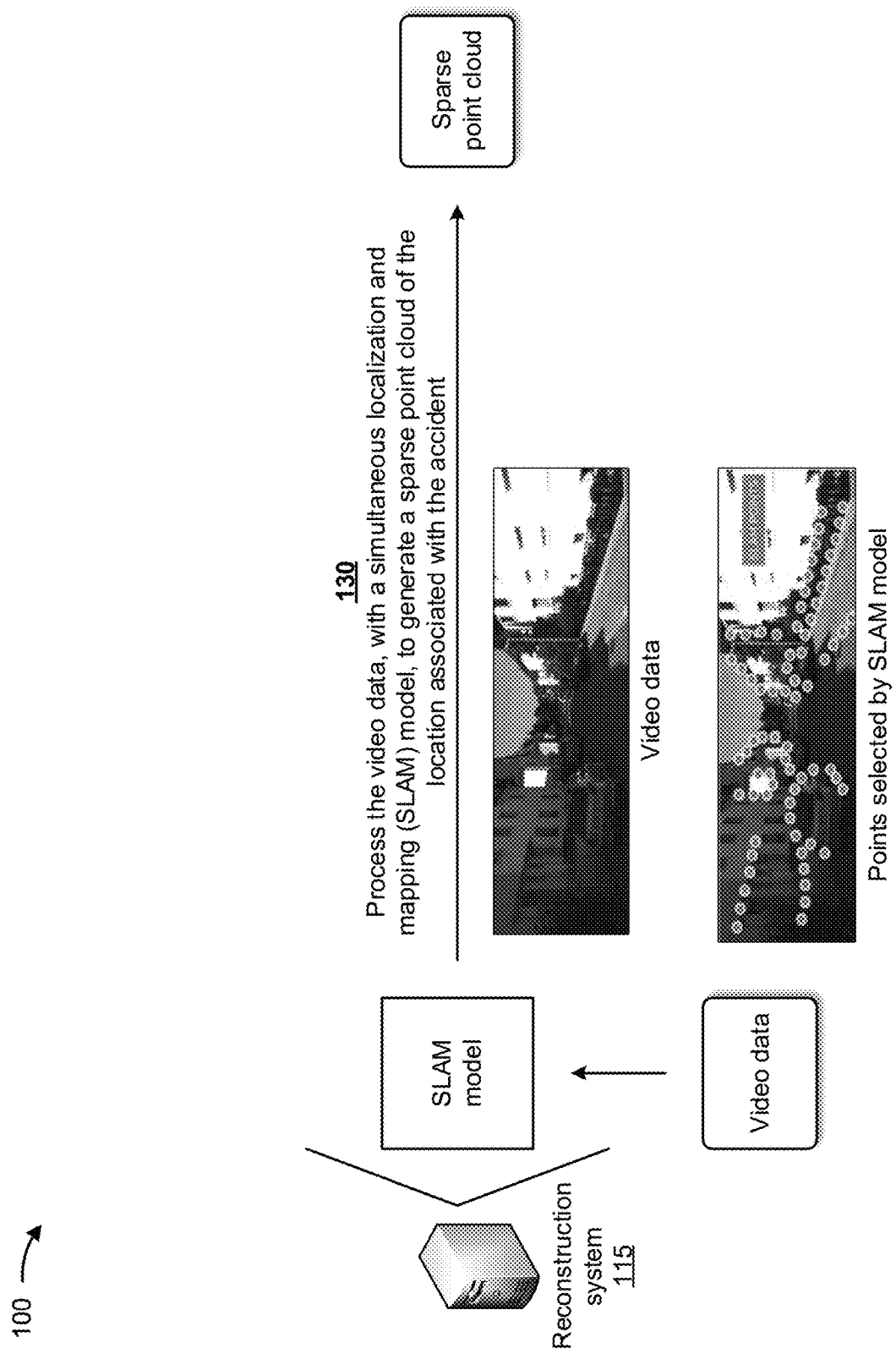

As shown in FIG. 1B, and by reference number 130, reconstruction system 115 may generate a sparse point cloud of the location associated with the accident. For example, reconstruction system 115 may process the video data, with a simultaneous localization and mapping (SLAM) model, to generate the sparse point cloud of the location associated with the accident. The SLAM model may include a model that constructs a three-dimensional map (e.g., a point cloud) of an environment based on the video data and that identifies a location of the first vehicle 110-1 within the point cloud. In some implementations, a direct sparse odometry (DSO) model is utilized as the SLAM model. A DSO model may include a direct and a sparse model for visual odometry. The DSO model may combine a fully direct probabilistic model (e.g., that minimizes a photometric error) with a consistent, joint optimization of all model parameters, including geometry (e.g., represented as an inverse depth in a reference frame) and camera motion.

The DSO model may select particular points in each frame of the video data based on a gradient of pixel intensity in each frame (e.g., corners and edges may be selected due to pixel intensity). The DSO model may utilize the particular points in consecutive frames of the video data to estimate a camera pose in every frame of the video data, with respect to a camera position in a first frame of the video data. After this, the DSO may generate a three-dimensional point cloud that corresponds to a sparse three-dimensional map of the location of the accident based on the particular points, and may generate camera poses, for all frames of the video data, that correspond to a trajectory of the first vehicle 110-1 with vehicle device 105.

Reconstruction system 115 may project the three-dimensional point cloud onto a ground plane to obtain a sparse overhead view (e.g., a bird's eye view (BEV)) representation of the location of the accident, and may project the camera poses onto the sparse overhead view to obtain the trajectory of the first vehicle 110-1. However, the resulting overhead view may include only points that the SLAM model selected and tracked, and thus may be sparse (e.g., contain less than a threshold quantity of points).

Figure 1C:
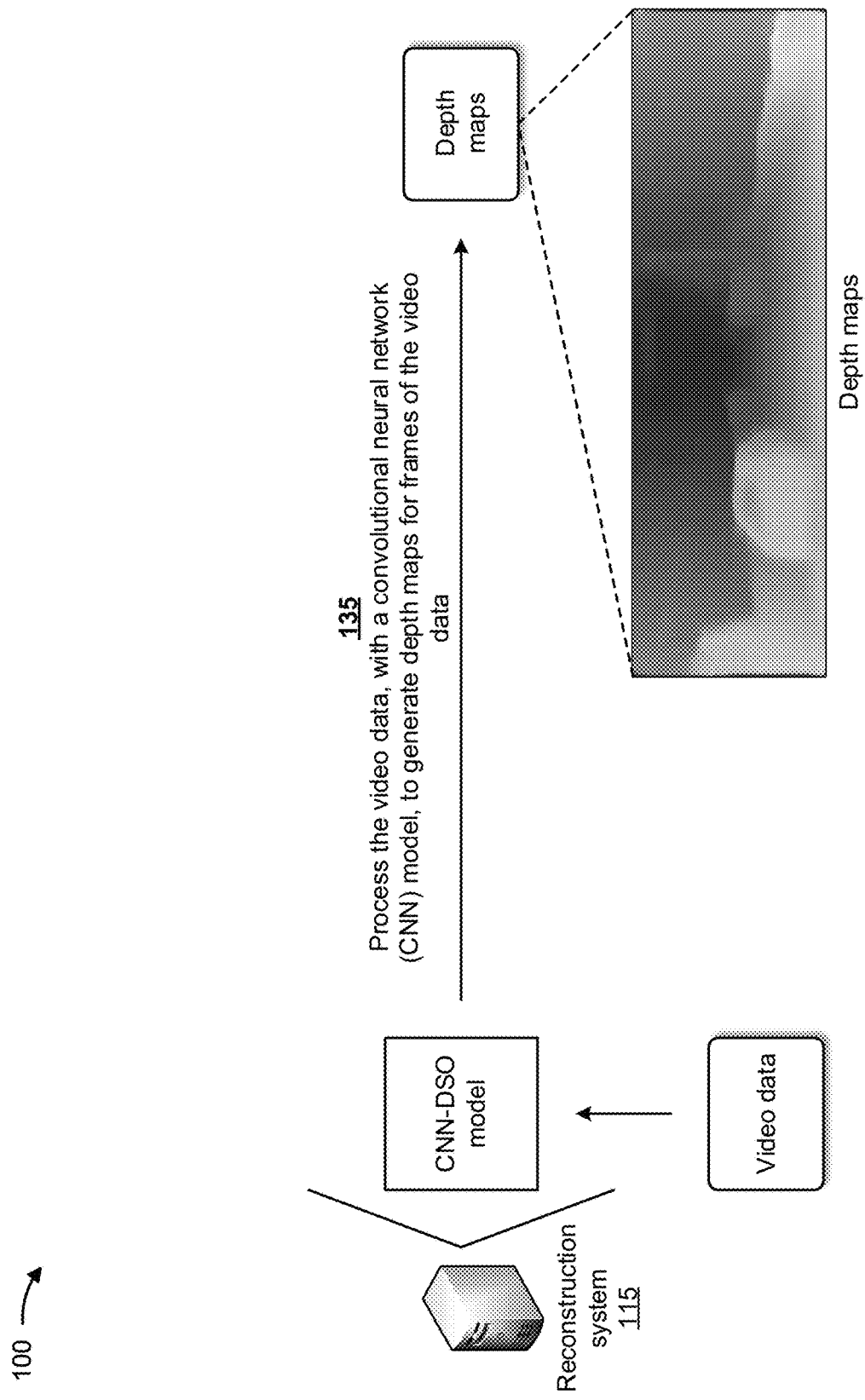

As shown in FIG. 1C, and by reference number 135, reconstruction system 115 may process the video data, with a convolutional neural network (CNN) model, to generate depth maps for the frames of the video data. In some implementations, in order for the SLAM model to perform optimally, an initial estimation of depth for the video data is determined. For example, the DSO model may be modified to utilize depth maps provided by a CNN model as the initial estimation of depth for the video data. A depth map (e.g., also referred to as a depth buffer, a Z-buffer, Z-buffering, or a Z-depth) may include an image that contains information relating to distances of surfaces of scene objects from a viewpoint. The CNN model is a class of deep neural network models that may be applied to analyzing visual imagery. In one example, the CNN model may include a monocular depth prediction model (e.g., a MonoDepth model) that predicts a depth map for every frame of the video data. The DSO model may receive the depth maps (e.g., the initial estimations) and may refine the depth maps.

Figure 1D:
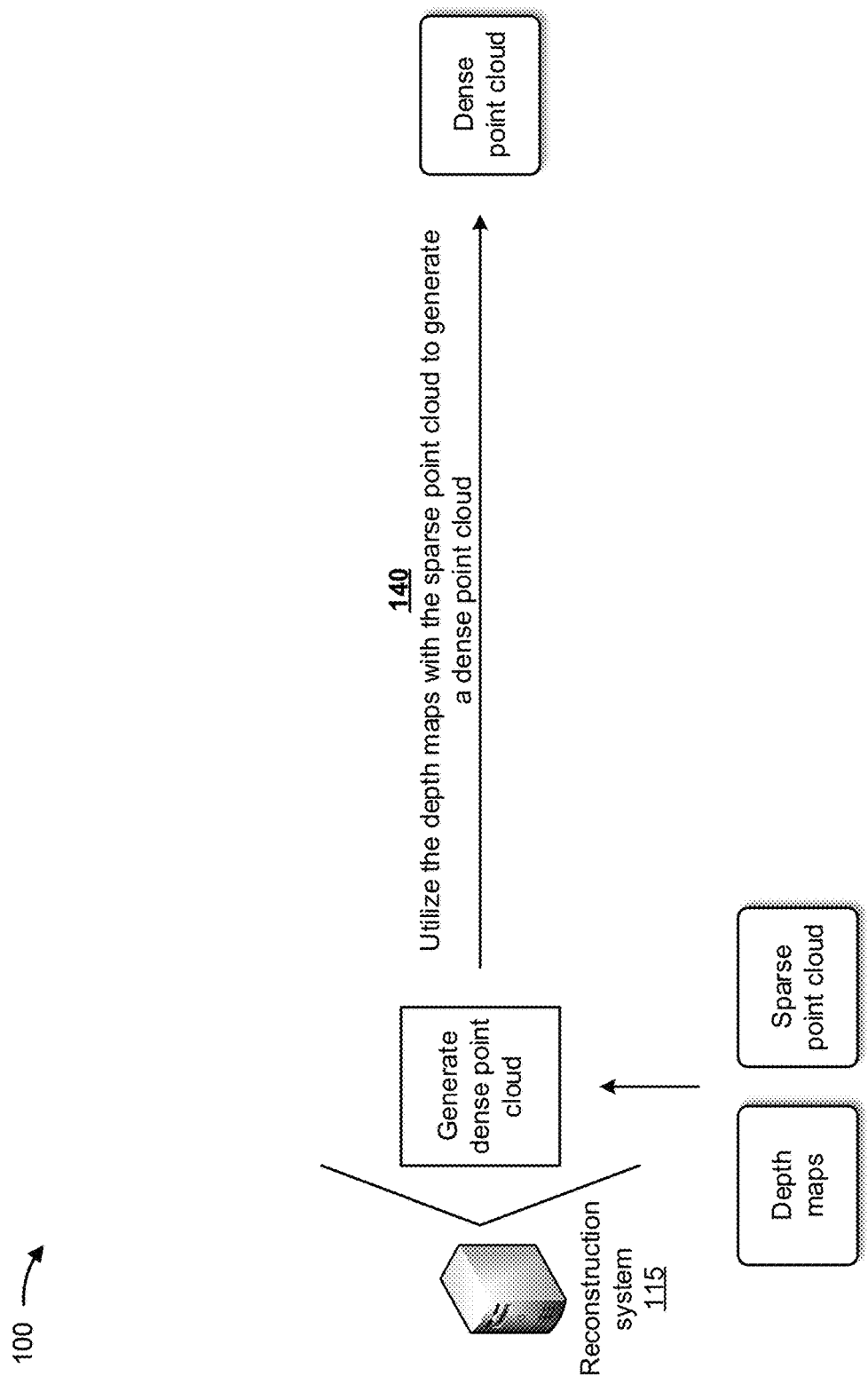

As shown in FIG. 1D, and by reference number 140, reconstruction system 115 may utilize the depth maps with the sparse point cloud to generate a dense point cloud. For example, reconstruction system 115 may utilize information associated with the depth maps to enrich the sparse point cloud with additional points. If the SLAM model (e.g., the DSO model) selects only a few points for each frame of the video data, reconstruction system 115 may add, to the sparse point cloud, all points of each frame from the depth maps determined by a depth estimation model (e.g., a MonoDepth model) and refined by the SLAM model (e.g., the DSO model), as described above. Using the depth maps for every frame enables generation of a more detailed and denser point cloud from the sparse point cloud. For example, if the video data includes approximately one hundred frames, reconstruction system 115 may generate a dense point cloud that includes approximately thirty million points.

Figure 1E:
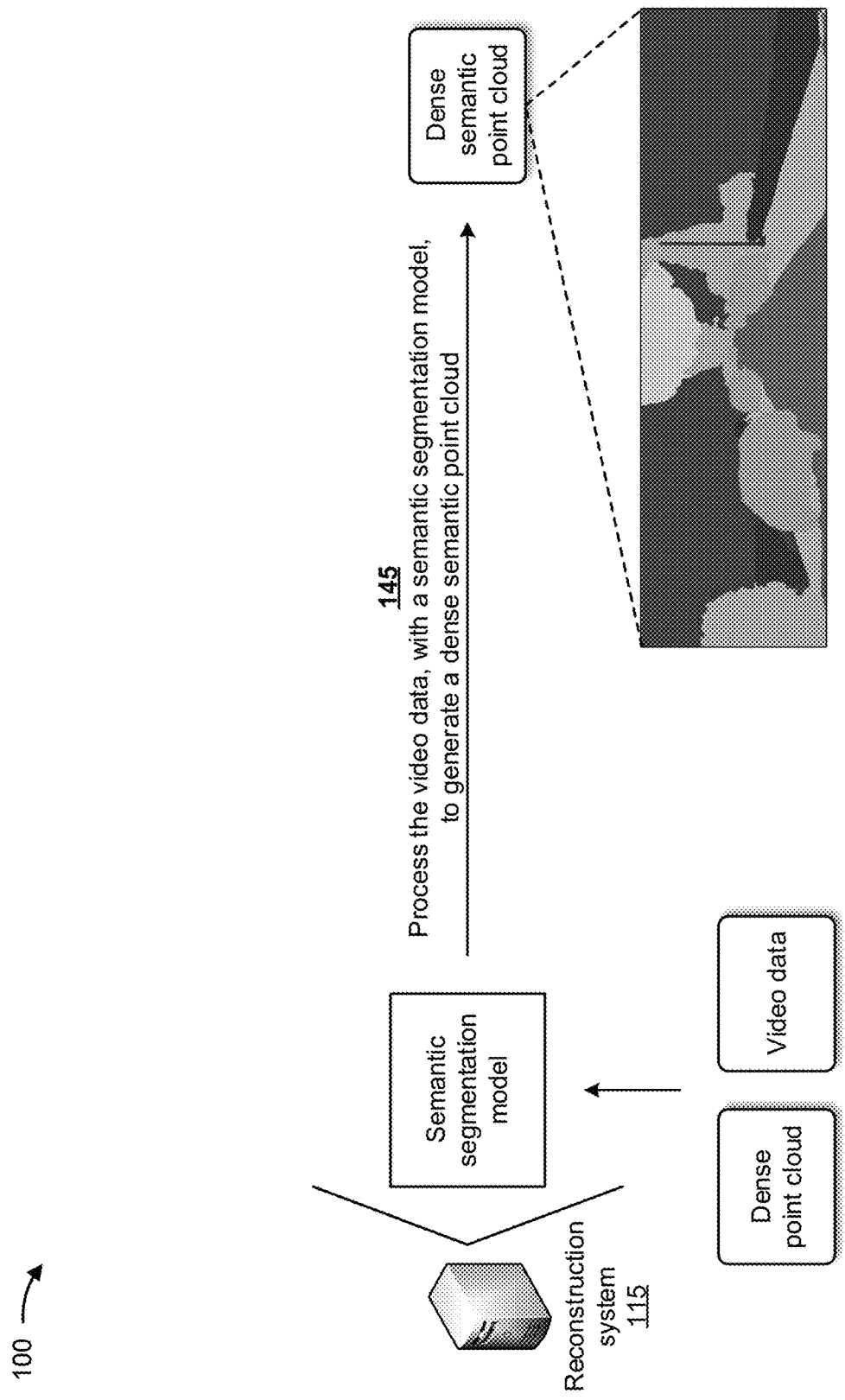

As shown in FIG. 1E, and by reference number 145, reconstruction system 115 may generate a dense semantic point cloud. For example, reconstruction system 115 may process the video data, with a semantic segmentation model, to generate the dense semantic point cloud. In some implementations, reconstruction system 115 may store, in the dense point cloud, information indicating what each point represents. Such information may be needed in order to correctly handle the points in the dense point cloud. In some implementations, the semantic segmentation model may store such information in the dense point cloud to generate the dense semantic point cloud. The semantic segmentation model may perform semantic segmentation on each frame of the video data. Semantic segmentation may include receiving each frame (e.g., image) as an input and assigning semantic classes (e.g., a road, a vehicle, a tree, and/or the like) to the pixels included in each frame. In some implementations, the semantic segmentation model includes a neural network model, such as DeepLabv3+. Reconstruction system 115 may perform semantic segmentation for every frame of the video data to generate semantic labels for each point in the dense point cloud. Thus, the points of the dense semantic point cloud may include the generated semantic labels.

Figure 1F:
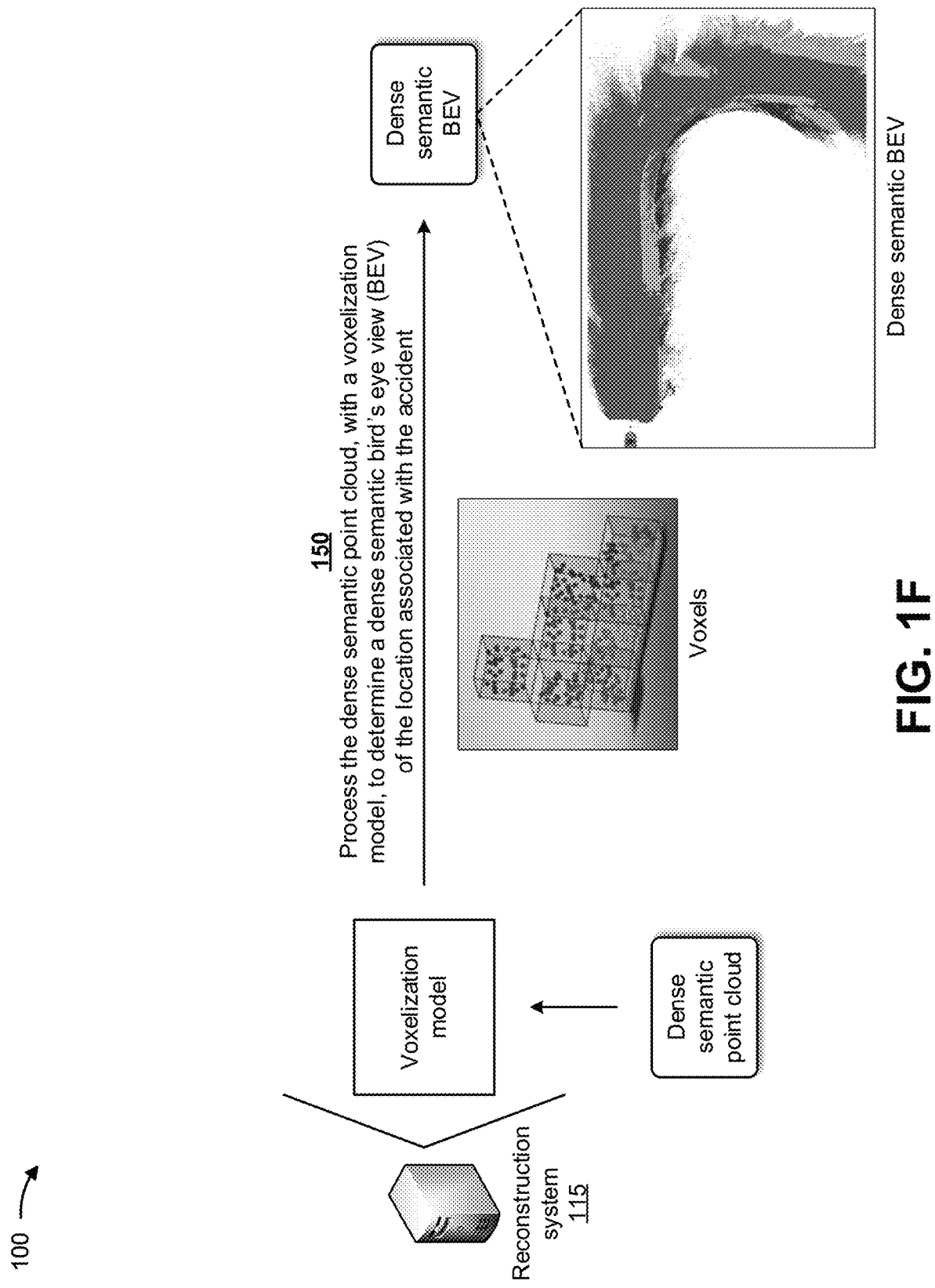

As shown in FIG. 1F, and by reference number 150, reconstruction system 115 may process the dense semantic point cloud, with a voxelization model, to determine a dense semantic overhead view (BEV) of the location associated with the accident. A simple top-down projection is insufficient to generate the dense semantic BEV from the dense semantic point cloud. Thus, reconstruction system 115 utilizes the voxelization model. In some implementations, the voxelization model may quantize the dense semantic point cloud into unit cubes called voxels. Each voxel may include a side length expressed in point cloud units. Each voxel may also include all points of the dense semantic point cloud associated with a particular region of the dense semantic point cloud. It is possible that a voxel includes points from multiple semantic classes. In such situations, the voxelization model may assign a single label to such a voxel (e.g., a semantic label associated with a majority of the points included in the voxel).

Reconstruction system 115 may determine the dense semantic BEV by creating a single pixel for each pair of horizontal voxel coordinates. For example, reconstruction system 115, for stacked voxels, may retain only a voxel with a lowest height, and may assign a corresponding semantic class to a corresponding pixel in the dense semantic BEV.

Figure 1G:
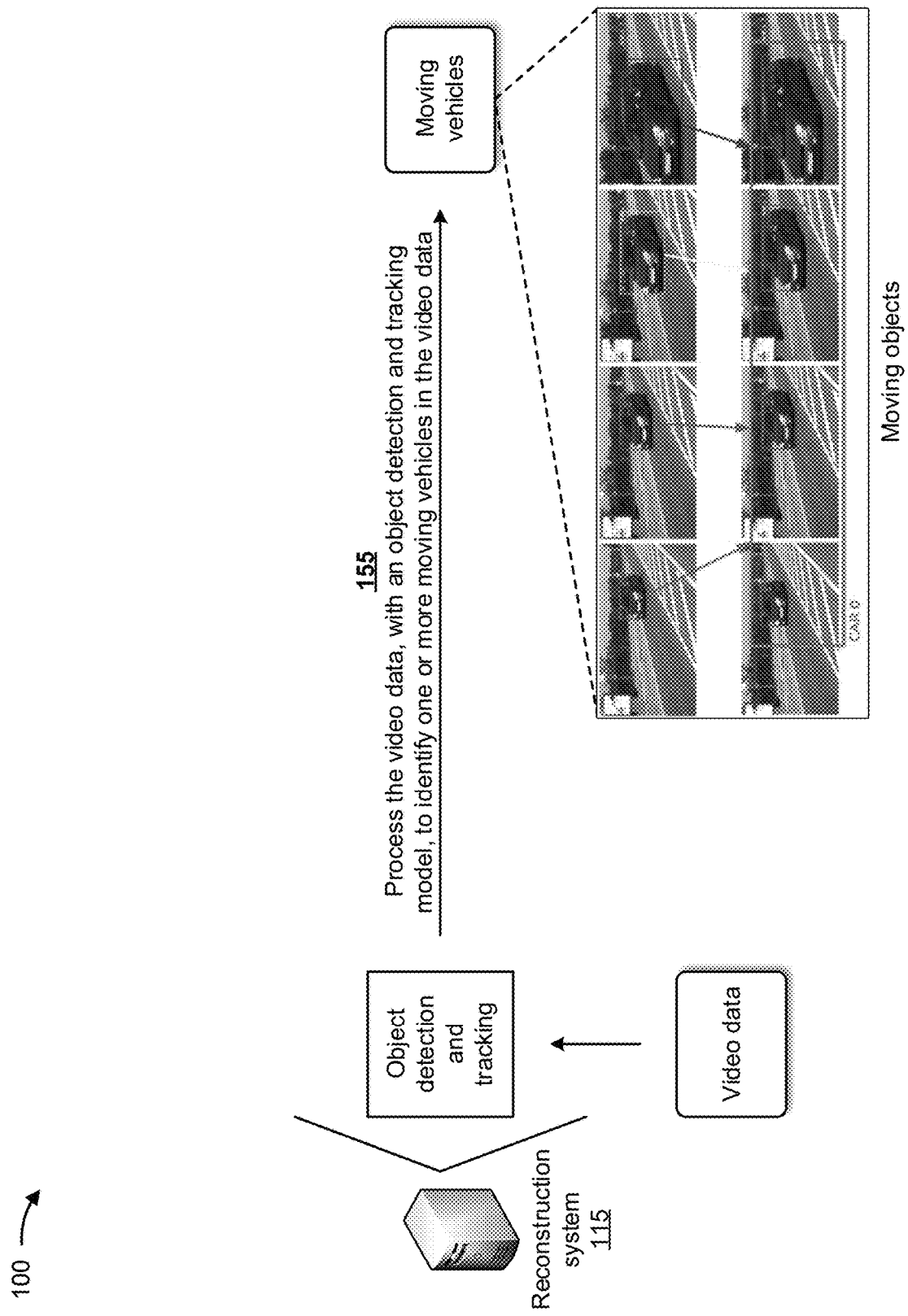

As shown in FIG. 1G, and by reference number 155, reconstruction system 115 may process the video data, with an object detection and tracking model, to identify one or more moving vehicles in the video data. The dense semantic BEV may include a vehicle trajectory. However, moving vehicles and objects may not be tracked by the SLAM model, and thus not appear in the dense semantic BEV. Thus, reconstruction system 115 may utilize additional information, based on object detection and multiple object tracking, to track moving objects in the dense semantic BEV. In some implementations, reconstruction system 115 may utilize an object detection model (e.g., YOLOv3, Faster R-CNN, and/or the like) to detect objects in the frames of the video data. After object detection, reconstruction system 115 may obtain, for every frame of the video data, a bounding box and a class for each detected object. Reconstruction system 115 may filter unwanted classes of the detected objects. For example, reconstruction system 115 may retain classes of the detected objects associated with vehicles, pedestrians, and/or the like. Reconstruction system 115 may utilize a multiple object tracking model to identify the bounding boxes of same vehicles across frames of the video data. In some implementations, the multiple object tracking model is based on intersection over union (IOU) of bounding boxes in consecutive frames of the video data.

Figure 1H:
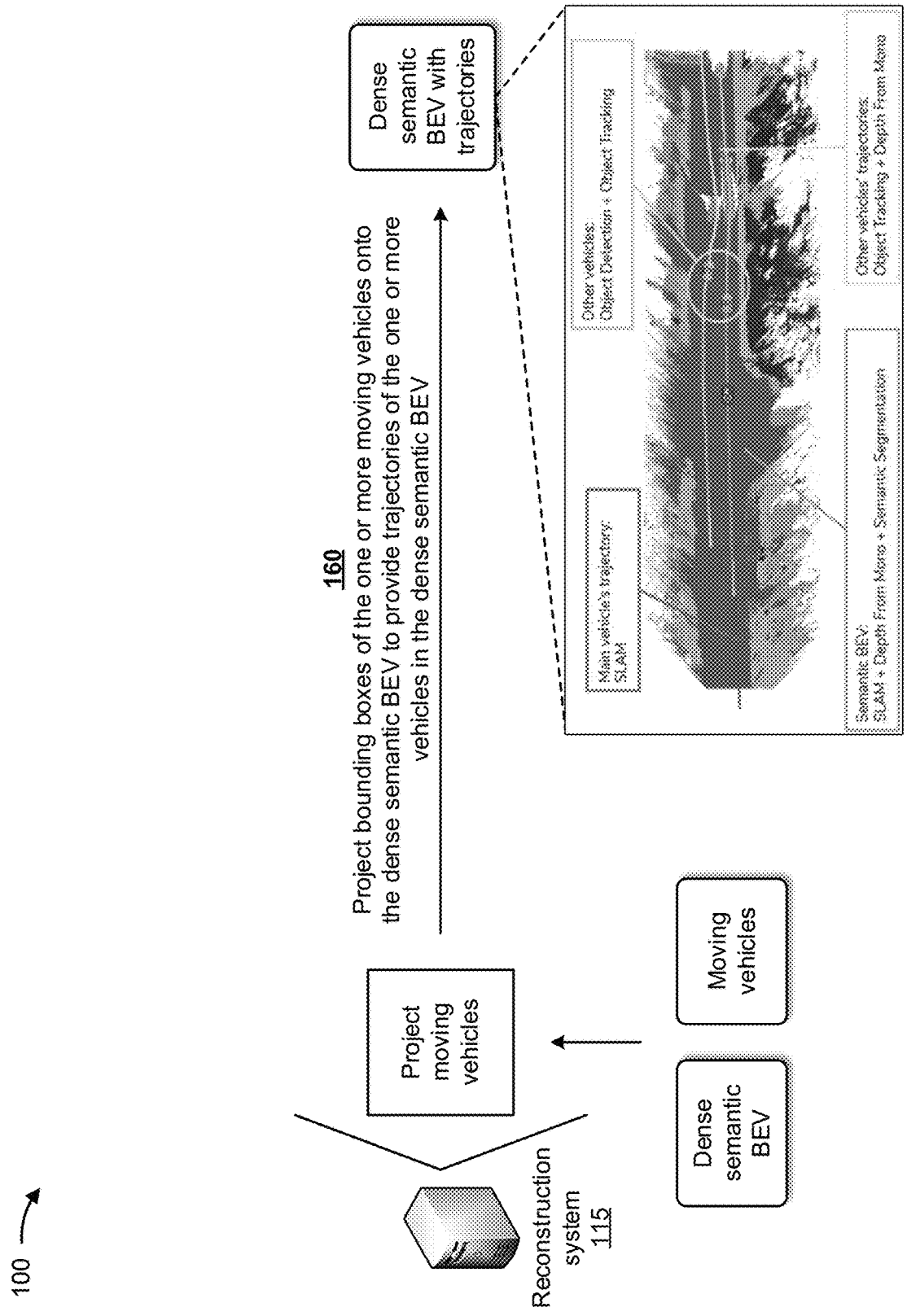

As shown in FIG. 1H, and by reference number 160, reconstruction system 115 may project bounding boxes of the one or more moving vehicles onto the dense semantic BEV to provide trajectories of the one or more vehicles in the dense semantic BEV. After utilizing the multiple object tracking model, a list of objects, with corresponding bounding boxes in every frame in which each object is detected, may be generated. Reconstruction system 115 may approximate each bounding box with a single point and may calculate a depth of each bounding box as a median of depths included in the bounding box. Reconstruction system 115 may utilize the single point approximated for each bounding box, the depth of each bounding box, and a camera pose of a frame to project each bounding box of an object onto the dense semantic BEV and to provide a trajectory of the object in the dense semantic BEV.

Figure 1I:
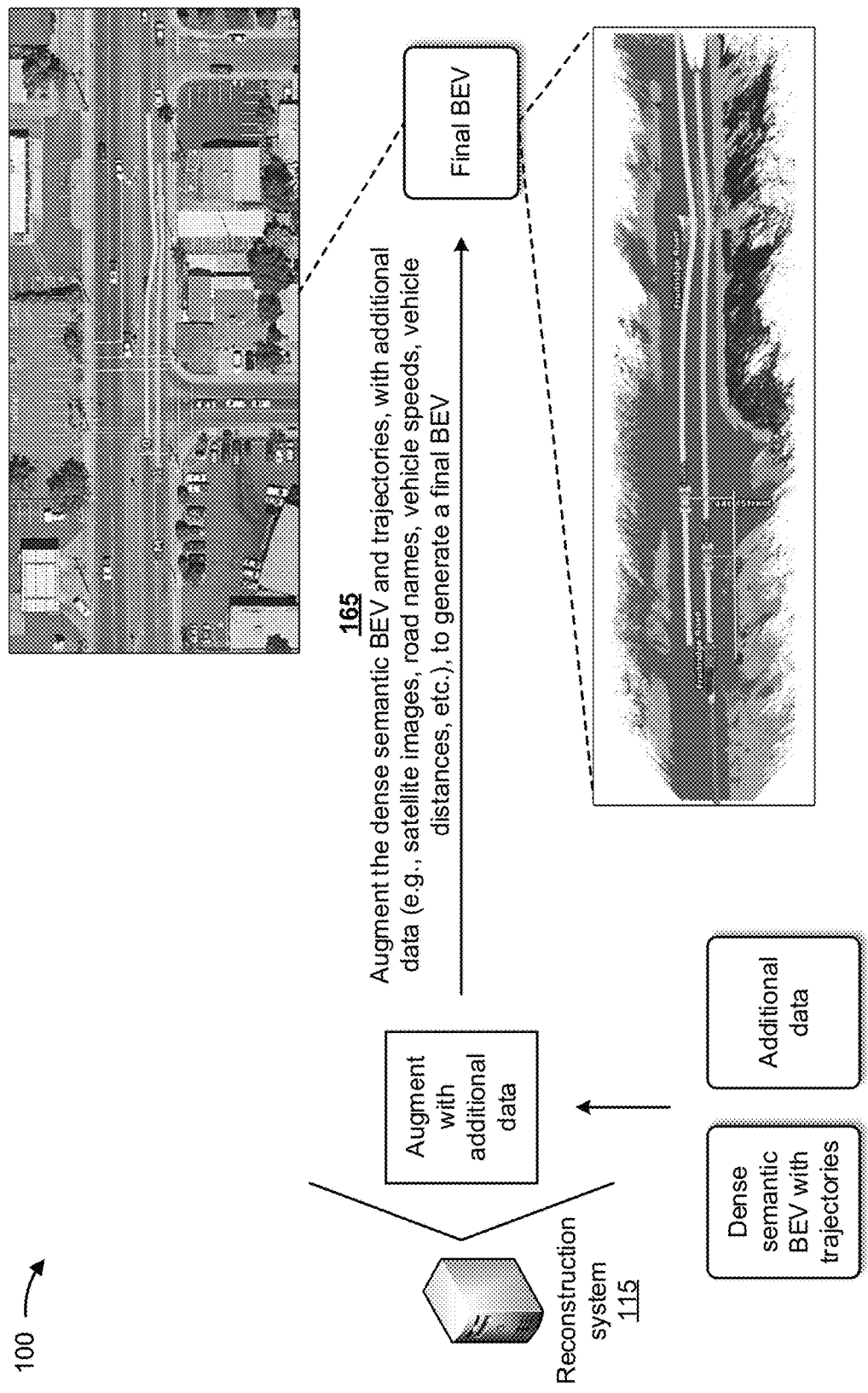

As shown in FIG. 1I, and by reference number 165, reconstruction system 115 may augment the dense semantic BEV and trajectories, with additional data, to generate a final BEV. For example, reconstruction system 115 may augment the dense semantic BEV with additional data, such as satellite images, data identifying road names, data identifying vehicle speeds, data identifying vehicle distances, and/or the like.

In some implementations, in order to augment satellite images with the dense semantic BEV, reconstruction system 115 may map coordinates of the dense semantic BEV to GPS coordinates. For example, reconstruction system 115 may assign, to each GPS point, a point of a trajectory of first vehicle 110-1 as reconstructed by the DSO model, since GPS frequencies may differ from video/camera frequencies. GPS coordinates represent a point on a spherical surface while coordinates of the dense semantic BEV are Cartesian coordinates, making the process of establishing correspondence among points more complex. To avoid this issue, reconstruction system 115 may convert GPS latitude-longitude coordinates to East-North-Up based on a Cartesian coordinate frame representing points on a plane tangent to a surface of the Earth at a given origin point (e.g., a first GPS point). Reconstruction system 115 may approximate the mapping from the coordinates of the dense semantic BEV to the GPS coordinates with the mapping from the dense semantic BEV horizontal x-y plane to the East-North plane, thus discarding elevation information.

The mapping approximation may be performed with several different transforms, each with different degrees of freedom and assumptions. For example, reconstruction system 115 may utilize a partial affine transform (e.g., a rigid transform plus uniform scale) with four degrees of freedom and assuming uniform scaling along the two axes. In another example, reconstruction system 115 may perform the mapping approximation with a robust model estimation iterative model, followed by a nonlinear least square refinement model. To provide a better estimation, reconstruction system 115 may discard GPS points too close to each other to avoid overfitting.

In some implementations, reconstruction system 115 may replace the dense semantic BEV with a satellite view of the location by transforming all trajectories (e.g., of first vehicle 110-1 and the other vehicles 110) from dense semantic BEV coordinates into GPS coordinates, as described above, and plotting resulting points onto a satellite image map. The final BEV with the satellite image map is shown at the top of FIG. 1I. In some implementations, the final BEV may include the dense semantic BEV, the satellite image with the trajectories and vehicles 110, a hybrid of the satellite image and the dense semantic BEV, and/or the like.

In some implementations, reconstruction system 115 may add road names to the dense semantic BEV. Adding road names to the dense semantic BEV may be difficult since road maps are stylized and simplified, and include differences between a real path of the road. Also, GPS coordinates are not always accurate and retrieved GPS coordinates may include noise and drift leading to a path tracked by a GPS sensor to be offset from a real traveled road.

In order to address these difficulties, reconstruction system 115 may perform map matching of a GPS trajectory with logical roads (e.g., via one or more application programming interfaces (APIs)). This may include mapping each input GPS point to points placed along the logical roads using information, such as a direction of motion and a direction in which a road can be traveled, to guide the process. Reconstruction system 115 may provide, as input to the map matching, points obtained during a time period (e.g., every one second) from a trajectory of the first vehicle 110-1, and may map these points to GPS coordinates. Since the mapping between the dense semantic BEV and GPS coordinates uses the original (e.g., noisy) GPS points, by comparing each input point to a corresponding output of the map matching, reconstruction system 115 may determine a first factor in placing the logical road network on top of the dense semantic BEV. Reconstruction system 115 may determine the first factor by calculating a mean translation from each output point (e.g., converted to dense semantic BEV coordinates) to the corresponding input (e.g., in dense semantic BEV coordinates).

To obtain information about roads nearby, reconstruction system 115 may utilize an output of the map matching as an input to an application programming interface (API) that provides information about the nearby roads. The output of the map matching may include road segments, with each road segment representing a portion of a road with endpoints corresponding to junctions (or dead ends). Each road segment may include information about a road name (if any) and a path in GPS coordinates defined by at least two or more points. Reconstruction system 115 may provide a first placement of logical roads on top of the dense semantic BEV by mapping GPS coordinates of the logical roads to dense semantic BEV coordinates and then applying a positioning factor, as described above.

This first placement may still be inaccurate as real roads can be very large while logical roads have no width. An ideal placement may include providing the logical road in a middle of an area of the dense semantic BEV marked as road. To obtain the ideal placement, reconstruction system 115 may utilize an iterative process that includes obtaining road points from the dense semantic BEV. A thick line (e.g., to be used as a mask) may be provided along each piece of a road segment (e.g., a straight line between two consecutive points representing a segment). The iterative process may include intersecting and identifying road points for the segment piece, and calculating a translation from the segment piece to a centroid of points. The iterative process may include applying an average translation to all segments, and repeating the aforementioned steps for each road segment to converge to a null translation.

Once a final position for the logical road network is determined, reconstruction system 115 may place the road names on the dense semantic BEV. Reconstruction system 115 may crop road segments to keep only portions inside the dense semantic BEV, and may link road segments by name and endpoints to obtain road paths. At junctions of three or more roads, reconstruction system 115 may split the road even if a name of the road before and after a junction is the same (e.g., thus, the road name may appear both before and after the junction). Reconstruction system 115 may place each road name in a middle of each road. Reconstruction system 115 may avoid placing road names on top of vehicle trajectories and may avoid overlapping road names.

In some implementations, reconstruction system 115 may augment the dense semantic BEV with vehicle distances and/or speeds (e.g., of vehicles 110) during the accident. Such information may be utilized to determine fault for an accident, insurance liability for the accident, and/or the like. The mapping between the GPS coordinates and the dense semantic BEV coordinates, described above, may be utilized to determine the vehicle distances and/or the vehicle speeds.

Reconstruction system 115 may calculate vehicle distances by using a Euclidean distance between relevant (e.g., rescaled) dense semantic BEV points, such as positions of two vehicles 110 at a same time. Alternatively, or additionally, reconstruction system 115 may calculate a distance along a local direction in which the first vehicle 110-1 is facing, utilizing the current position, along the local direction, as an origin.

Reconstruction system 115 may calculate vehicle speeds based on derivatives applied to vehicle trajectories. For example, given a trajectory (T) for a vehicle in rescaled dense semantic BEV coordinates, and a time point ($t_i$), in seconds, for which information is available, reconstruction system 115 may calculate a central derivative along each axis as:

$$S_x(t_i) = \frac{T_x(t_{i+1}) - T_x(t_{i-1})}{t_{i+1} - t_{i-1}}, \text{ and}$$

$$S_y(t_i) = \frac{T_y(t_{i+1}) - T_y(t_{i-1})}{t_{i+1} - t_{i-1}},$$

where S may correspond to a vehicle speed vector, $S_x$ may correspond to a derivative of the trajectory in the x-direction, $S_y$ may correspond to a derivative of the trajectory in the y-direction, $T_x$ may correspond to an x-position of the vehicle at a given time, and $T_y$ may correspond to a y-position of the vehicle at the given time. Reconstruction system 115 may calculate a magnitude of the speed vector (S) at each time point to obtain a speed of a vehicle at each time point in meters per second:

$$S(t_i) = \sqrt{S_x^2(t_i) + S_y^2(t_i)}.$$

In some implementations, reconstruction system 115 may provide the vehicle speeds and distances before, during, and after the accident in the final BEV. For example, reconstruction system 115 may provide a speed and a distance of a vehicle 110 near a representation of each vehicle 110 in the final BEV.

Figure 1J:
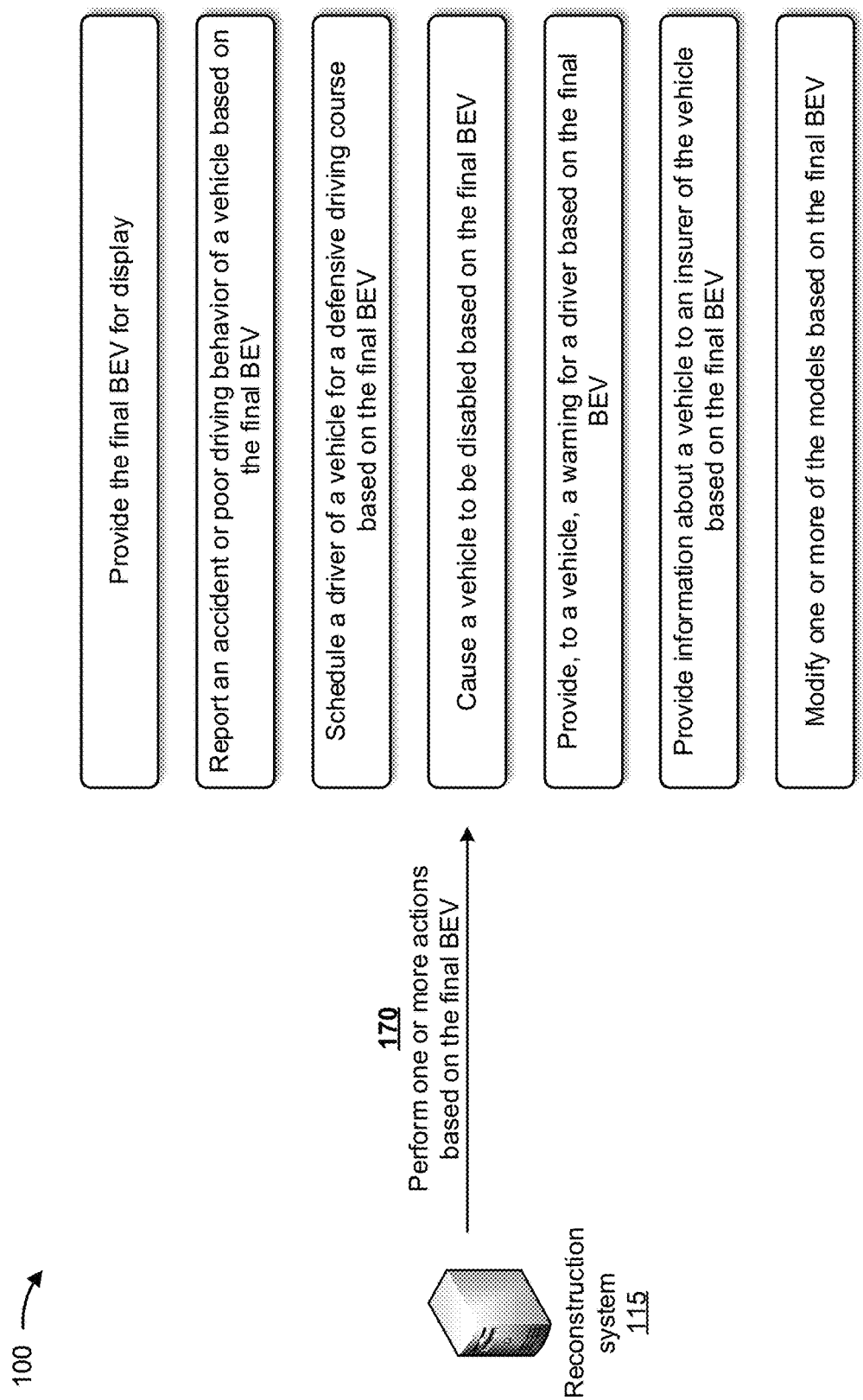

As shown in FIG. 1J, and by reference number 170, reconstruction system 115 may perform one or more actions based on the final BEV. The one or more actions may include reconstruction system 115 providing the final BEV for display. For example, reconstruction system 115 may provide the final BEV for display to a user of reconstruction system 115, to a device associated with traffic law enforcement (e.g., for determination of fault for the accident), to a device associated with an insurance company (e.g., for determination of insurance liability for the accident), to a device associated with a fleet operator (e.g., for determination of whether a driver of a fleet vehicle is exhibiting poor driving behavior), and/or the like. In this way, reconstruction system 115 may automatically reconstruct the accident scene for a determination of liability, poor driving behavior, fault, and/or the like. This may conserve resources (e.g., computing resources, networking resources, transportation resources, human resources, and/or the like) that would otherwise have been wasted in collecting various vehicle accident scene evidence, analyzing the evidence, drawing conclusions based on analyzing the evidence, and/or the like.

The one or more actions may include reconstruction system 115 reporting an accident or poor driving behavior of a vehicle based on the final BEV. For example, reconstruction system 115 may determine liability, poor driving behavior, fault, and/or the like based on the final BEV, and may report the determination to law enforcement, an insurance company, a fleet operator, a driver of the vehicle, and/or the like. This may conserve resources that would otherwise have been wasted in interpreting the final BEV, collecting various vehicle accident scene evidence, analyzing the evidence, drawing conclusions based on analyzing the evidence, and/or the like.

The one or more actions may include reconstruction system 115 scheduling a driver a vehicle for a defensive driving course based on the final BEV. For example, reconstruction system 115 may determine that the driver of the vehicle caused an accident or exhibited poor driving behavior based on analyzing the final BEV. Accordingly, reconstruction system 115 may schedule the driver for the defensive driving course so that the driver may become a better and safer driver. This may conserve resources that would otherwise have been wasted in scheduling the defensive driving course, endangering roadways with the driver, and/or the like.

The one or more actions may include reconstruction system 115 causing a vehicle to be disabled based on the final BEV. For example, reconstruction system 115 may determine that the vehicle is being recklessly operated by a driver based on the final BEV, and may automatically disable the vehicle to prevent the driver from causing an accident or damaging property. This may conserve resources that would otherwise have been wasted in handling an accident caused by the vehicle, handling property damage caused by the vehicle, dispatching law enforcement for an accident or property damage, handling legal issues associated with an accident or property damage, and/or the like.

The one or more actions may include reconstruction system 115 providing, to a vehicle, a warning for a driver based on the final BEV. For example, reconstruction system 115 may determine that the vehicle is being recklessly operated by the driver based on the final BEV, and may provide, to the driver, a warning message indicating that the driver is recklessly operating the vehicle. If the driver ignores the warning message and continues recklessly operating the vehicle, reconstruction system 115 may contact law enforcement about the driver, may disable the vehicle, and/or the like. This may conserve resources that would otherwise have been wasted in handling an accident caused by the vehicle, handling property damage caused by the vehicle, dispatching law enforcement for an accident or property damage, handling legal issues associated with an accident or property damage, and/or the like.

The one or more actions may include reconstruction system 115 providing information about a vehicle to an insurer of the vehicle based on the final BEV. For example, reconstruction system 115 may determine that the vehicle caused an accident based on the final BEV. Based on this determination, reconstruction system 115 may notify the insurer of the vehicle that the driver of the vehicle was responsible for the accident, which may enable the insurer to take appropriate action with the driver. This may conserve resources that would otherwise have been wasted in collecting various vehicle accident scene evidence, analyzing the evidence, drawing conclusions based on analyzing the evidence, and/or the like.

The one or more actions may include reconstruction system 115 modifying one or more of the simultaneous localization and mapping model, the convolutional neural network model, the semantic segmentation model, or the voxelization model based on the final BEV. In this way, reconstruction system 115 may improve an accuracy of the one or more models. This, in turn, may improve a speed and an efficiency of the one or more models, and thereby conserve computing resources, networking resources, and/or the like.

In this way, reconstruction system 115 utilizes machine learning and other models to reconstruct a vehicle accident scene from video. Reconstruction system 115 may automatically reconstruct the vehicle accident scene based on data received from vehicle device 105 of vehicle 110-1, such as video footage of the vehicle accident scene, location data and vehicle speeds at multiple positions of the vehicle accident scene, inertial measuring unit data, and/or the like. Reconstruction system 115 may analyze the data and may generate an overhead view (e.g., a bird's eye view) of dynamics of the vehicle accident, including trajectories of vehicles (e.g., the second vehicle 110-2 and the third vehicle 110-3) involved in the accident, speeds and distances of the vehicles before and during the accident, and/or the like. Reconstruction system 115 conserves computing resources, networking resources, transportation resources, human resources, and/or the like that would otherwise have been wasted in collecting various vehicle accident scene evidence, analyzing the evidence, drawing conclusions based on analyzing the evidence, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
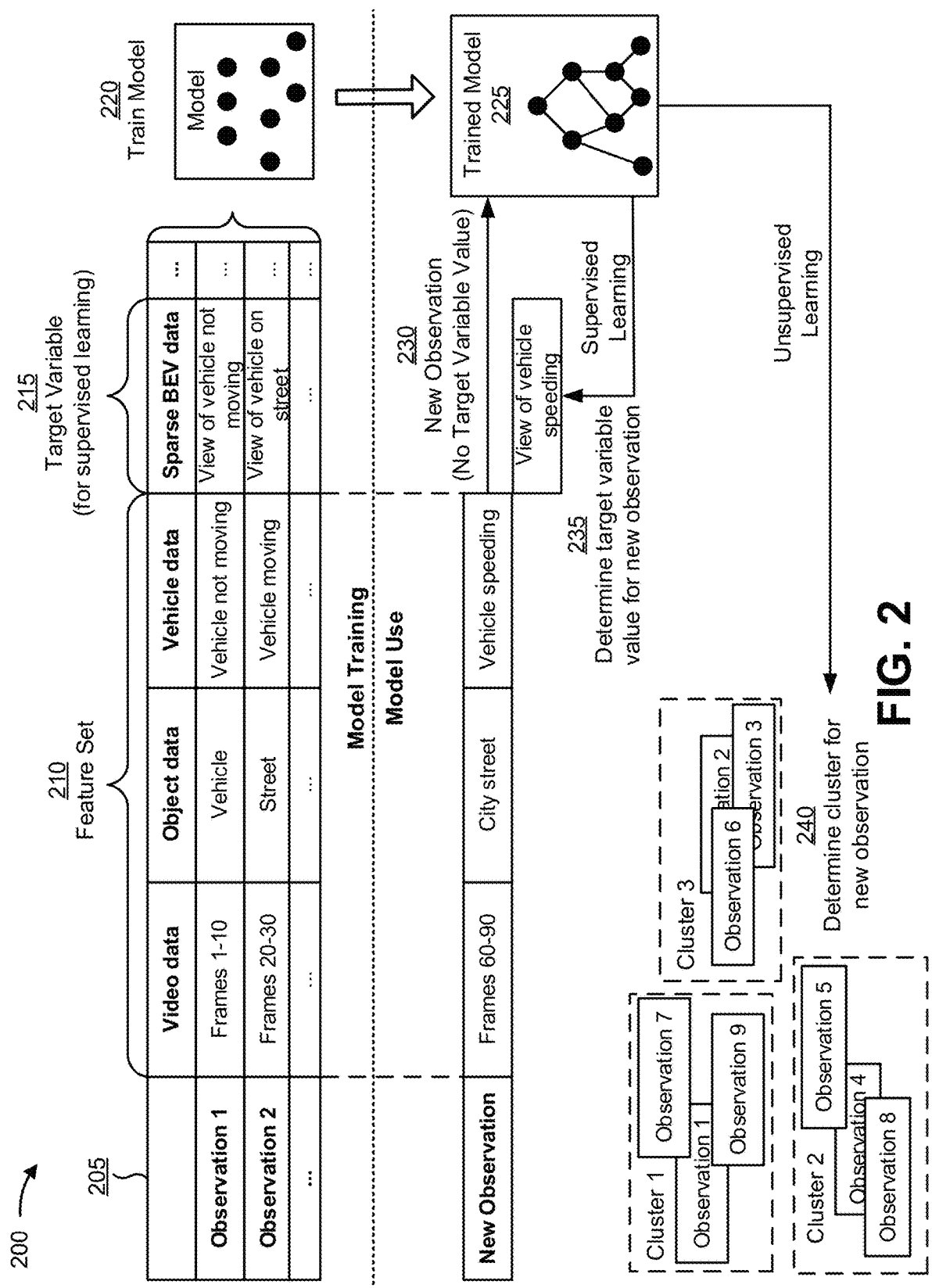
FIG. 2 is a diagram illustrating an example of training a machine learning model and applying a trained machine learning model to a new observation.

FIG. 2 is a diagram illustrating an example 200 of training and using a machine learning model in connection with reconstructing a vehicle accident scene from video. The machine learning model training and usage described herein may be performed using a machine learning system. The machine learning system may include or may be included in a computing device, a server, a cloud computing environment, and/or the like, such as reconstruction system 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from vehicle device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from vehicle device 105. For example, the machine learning system may identify a feature set (e.g., one or more features and/or feature values) by extracting the feature set from structured data, by processing image and video data, inertial data, GPS data, and/or the like, to extract the feature set from unstructured data, by receiving input from an operator, and/or the like.

As an example, a feature set for a set of observations may include a first feature of video data, a second feature of object data, a third feature of vehicle data, and so on. As shown, for a first observation, the first feature may include frames 1-10 of a video, the second feature may include an image of a vehicle, the third feature may indicate that the vehicle is not moving, and so on. These features and feature values are provided as examples, and may differ in other examples. For example, the feature set may include one or more of the following features: frames of video data captured by vehicle device 105, objects recognized in the video data (e.g., other vehicles, streets, sidewalks, pedestrians, road signs, traffic signals, and/or the like), vehicle data (e.g., acceleration, braking, vehicle speed, vehicle direction, and/or the like), and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable may be sparse BEV data, which includes an overhead view of a vehicle not moving for the first observation.

The feature set and target variable described above are provided as examples, and other examples may differ from what is described above. For example, for a target variable of the sparse BEV data, the feature set may include overhead views of vehicle accident locations, locations associated with near-miss accidents, and/or the like.

The target variable may represent a representation that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of frames 60-90, a second feature of a city street, a third feature of a vehicle speeding, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may determine an overhead view of a vehicle speeding on a city street for the target variable of the sparse BEV data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, report the speeding vehicle to authorities as a cause of an accident. The first automated action may include, for example, automatically contacting the police to report the accident.

As another example, if the machine learning system were to determine poor driving behavior (e.g., rather than an accident) for the target variable of the sparse BEV data, then the machine learning system may provide a second (e.g., different) recommendation (e.g., attend a defensive driving course) and/or may perform or cause performance of a second (e.g., different) automated action (e.g., automatically register the driver for a defensive driving course).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an overhead view of a vehicle causing an accident), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., poor driving behavior), then the machine learning system may provide a second (e.g., different) recommendation (e.g., attend a defensive driving course) and/or may perform or cause performance of a second (e.g., different) automated action, such as automatically schedule a driver for a defensive driving course.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to reconstruct a vehicle accident scene from video. The machine learning system enables recognition and/or identification of tens, hundreds, thousands, or millions of features and/or feature values for tens, hundreds, thousands, or millions of observations, thereby increasing accuracy and consistency and reducing delay associated with reconstructing a vehicle accident scene from video relative to requiring computing resources to be allocated for tens, hundreds, or thousands of operators to manually reconstructing a vehicle accident scene from video using the features or feature values.

As indicated above, FIG. 2 is provided as an example. Other examples may differ from what is described in connection with FIG. 2.

Figure 3:
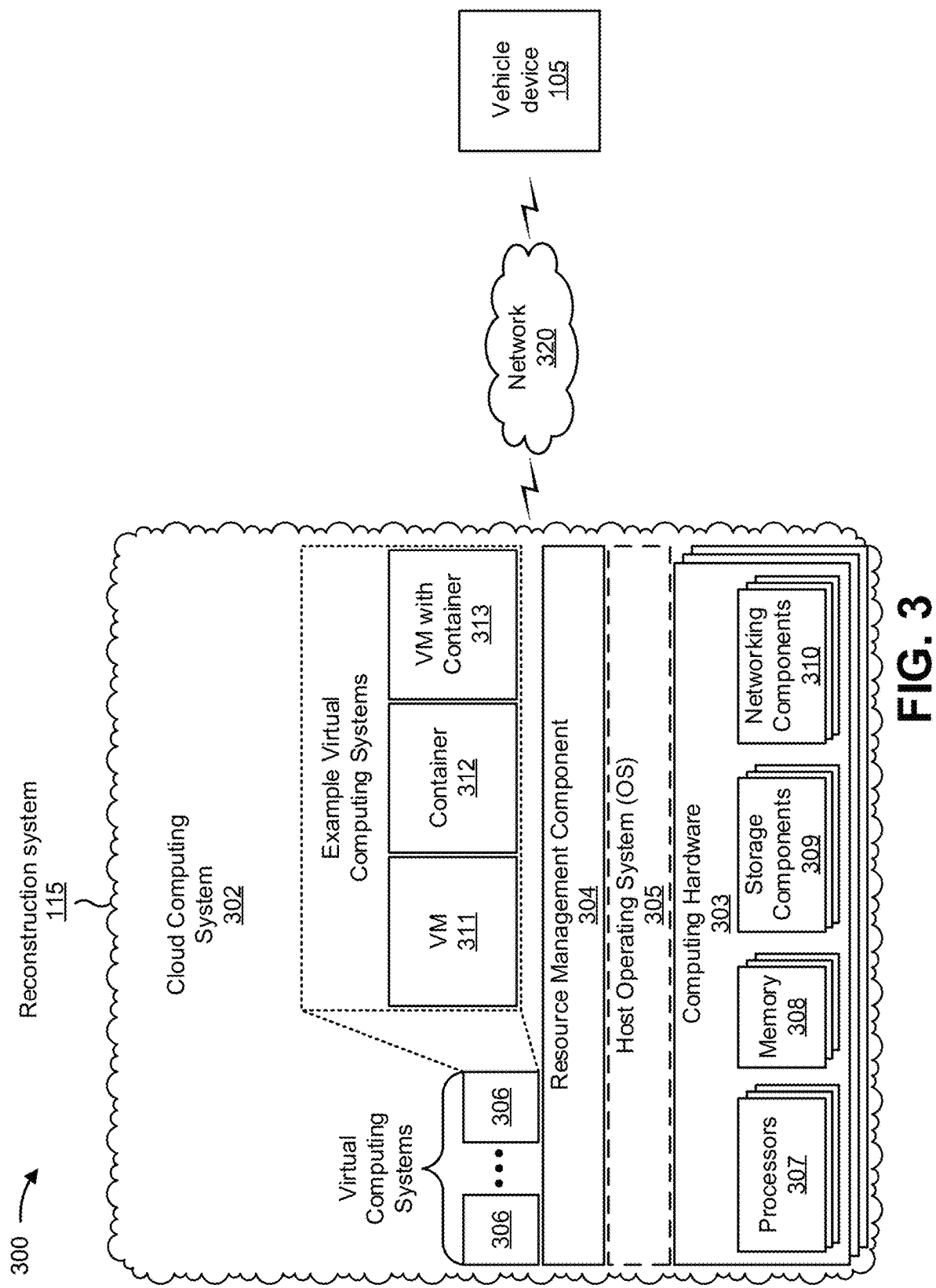
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a reconstruction system 115, which may include one or more elements of and/or may execute within a cloud computing system 302. The cloud computing system 302 may include one or more elements 303-313, as described in more detail below. As further shown in FIG. 3, environment 300 may include vehicle device 105 and/or a network 320. Devices and/or elements of environment 300 may interconnect via wired connections and/or wireless connections.

Vehicle device 105 includes one or more devices capable of receiving, generating, storing, processing, and/or providing information, such as information described herein. For example, vehicle device 105 may include a device included in a vehicle (e.g., vehicle 110) for obtaining video data associated with vehicle 110 traveling along a route. For example, vehicle device 105 may include a video camera, a dash camera, a parking assist camera, a backup assist camera, a thermal camera, lidar, radar, and/or the like. In some implementations, vehicle device 105 may include a device for obtaining other types of data associated with vehicle 110 traveling along a route. For example, vehicle device 105 may include an inertial measurement unit, a three-axis accelerometer, a gyroscope, a global positioning system (GPS) device, an on-board diagnostics (OBD) device, a vehicle tracking unit, an engine control unit (ECU), and/or the like.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the reconstruction system 115 may include one or more elements 303-313 of the cloud computing system 302, may execute within the cloud computing system 302, and/or may be hosted within the cloud computing system 302, in some implementations, the reconstruction system 115 may not be cloud-based (e.g., may be implemented outside of a cloud computing system) or may be partially cloud-based. For example, the reconstruction system 115 may include one or more devices that are not part of the cloud computing system 302, such as device 400 of FIG. 4, which may include a standalone server or another type of computing device. The reconstruction system 115 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
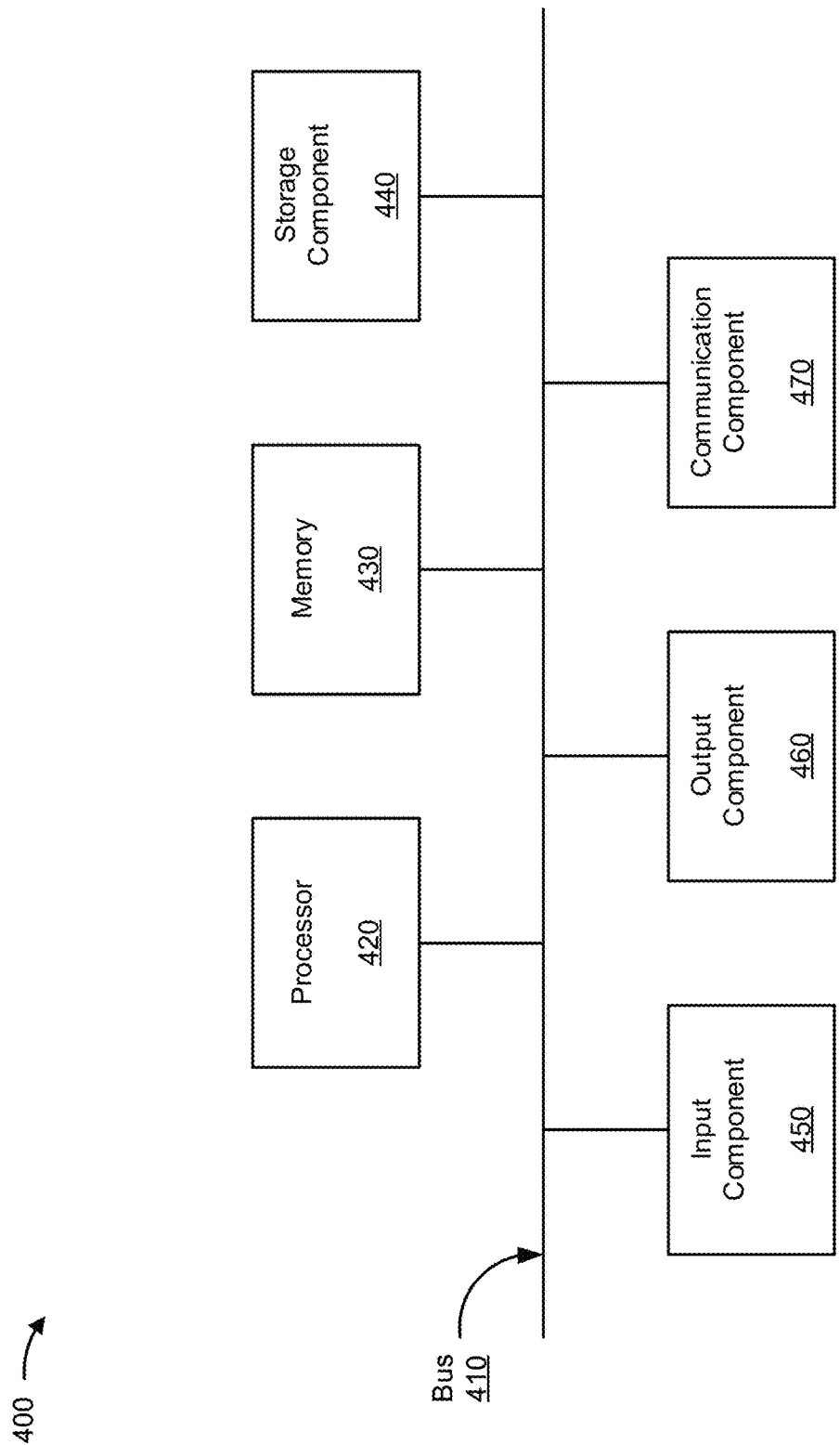
FIG. 4 is a diagram of example components of one or more devices of FIG. 3.

FIG. 4 is a diagram of example components of a device 400, which may correspond to vehicle device 105, reconstruction system 115, and/or computing hardware 303. In some implementations, vehicle device 105, reconstruction system 115, and/or computing hardware 303 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
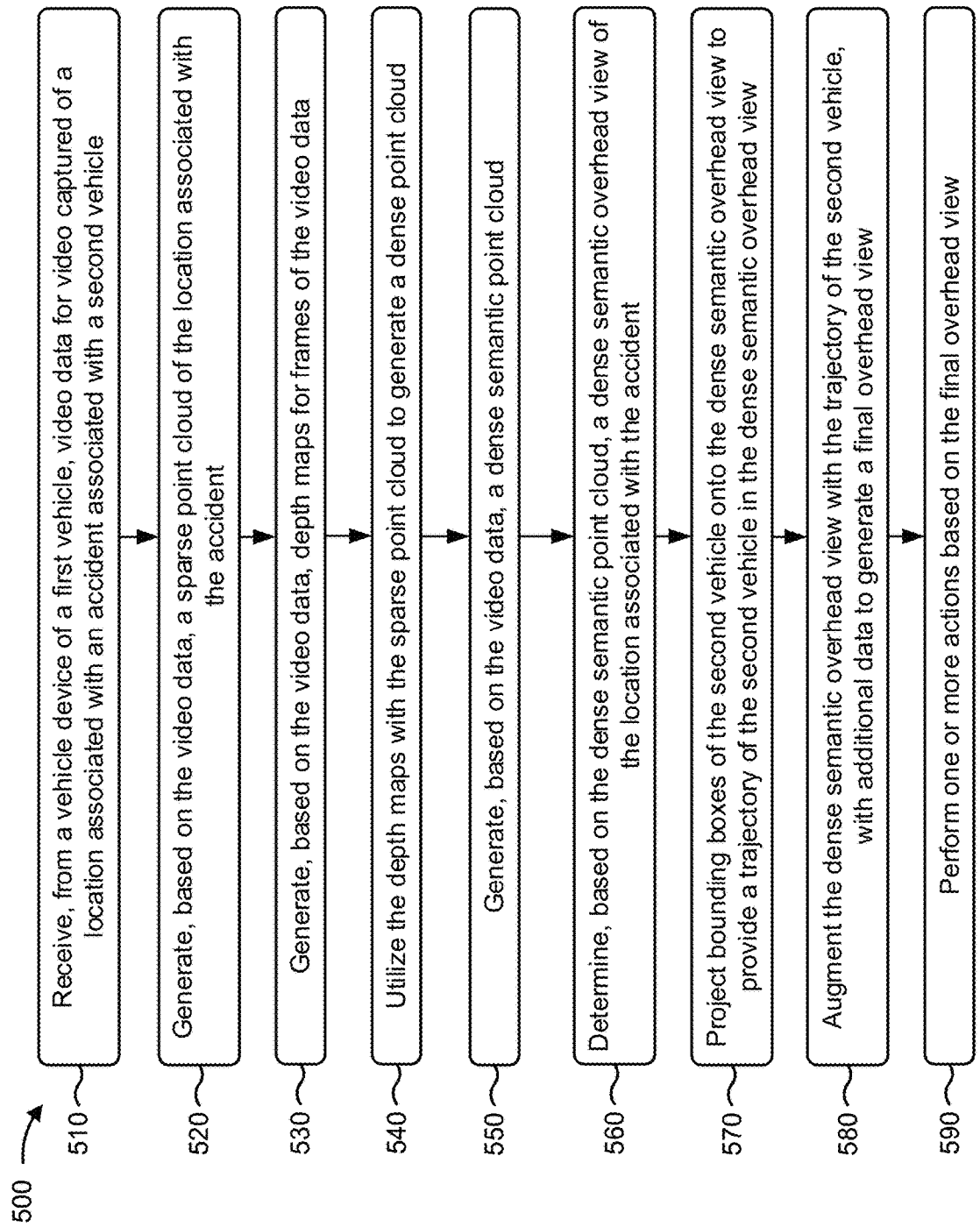
FIG. 5 is a flow chart of an example process for utilizing machine learning and other models to reconstruct a vehicle accident scene from video.

FIG. 5 is a flowchart of an example process 500 associated with utilizing machine learning and other models to reconstruct a vehicle accident scene from video. In some implementations, one or more process blocks of FIG. 5 may be performed by a device (e.g., reconstruction system 115). In some implementations, one or more process blocks of FIG. 5 may be performed by another device or a group of devices separate from or including the device, such as vehicle device 105. Additionally, or alternatively, one or more process blocks of FIG. 5 may be performed by one or more components of device 400, such as processor 420, memory 430, storage component 440, input component 450, output component 460, communication component 470, and/or the like.

As shown in FIG. 5, process 500 may include receiving, from a vehicle device of a first vehicle, video data for video captured of a location associated with an accident associated with a second vehicle (block 510). For example, the device may receive, from a vehicle device of a first vehicle, video data for video captured of a location associated with an accident associated with a second vehicle, as described above.

As further shown in FIG. 5, process 500 may include generating, based on the video data, a sparse point cloud of the location associated with the accident (block 520). For example, the device may generate, based on the video data, a sparse point cloud of the location associated with the accident, as described above.

As further shown in FIG. 5, process 500 may include generating, based on the video data, depth maps for frames of the video data (block 530). For example, the device may generate, based on the video data, depth maps for frames of the video data, as described above.

As further shown in FIG. 5, process 500 may include utilizing the depth maps with the sparse point cloud to generate a dense point cloud (block 540). For example, the device may utilize the depth maps with the sparse point cloud to generate a dense point cloud, as described above.

As further shown in FIG. 5, process 500 may include generating, based on the video data, a dense semantic point cloud (block 550). For example, the device may generate, based on the video data, a dense semantic point cloud, as described above.

As further shown in FIG. 5, process 500 may include determining, based on the dense semantic point cloud, a dense semantic overhead view of the location associated with the accident (block 560). For example, the device may determine, based on the dense semantic point cloud, a dense semantic overhead view of the location associated with the accident, as described above.

As further shown in FIG. 5, process 500 may include projecting bounding boxes of the second vehicle onto the dense semantic overhead view to provide a trajectory of the second vehicle in the dense semantic overhead view (block 570). For example, the device may project bounding boxes of the second vehicle onto the dense semantic overhead view to provide a trajectory of the second vehicle in the dense semantic overhead view, as described above.

As further shown in FIG. 5, process 500 may include augmenting the dense semantic overhead view with the trajectory of the second vehicle, with additional data to generate a final overhead view (block 580). For example, the device may augment the dense semantic overhead view with the trajectory of the second vehicle, with additional data to generate a final overhead view, as described above.

As further shown in FIG. 5, process 500 may include performing one or more actions based on the final overhead view (block 590). For example, the device may perform one or more actions based on the final overhead view, as described above.

Process 500 may include additional implementations, such as any single implementation or any combination of implementations described below and/or in connection with one or more other processes described elsewhere herein.

In a first implementation, performing the one or more actions includes one or more of providing the final overhead view for display, reporting the accident or poor driving behavior associated with the second vehicle based on the final overhead view, scheduling a driver of the first vehicle for a defensive driving course based on the final overhead view, or causing the second vehicle to be disabled based on the final overhead view.

In a second implementation, performing the one or more actions includes one or more of providing, to the second vehicle, a warning for a driver based on the final overhead view, or providing information about the second vehicle to an insurer of the second vehicle based on the final overhead view.

In a third implementation, generating the sparse point cloud of the location associated with the accident includes processing the video data, with a simultaneous localization and mapping model, to generate the sparse point cloud of the location associated with the accident.

In a fourth implementation, generating the depth maps for the frames of the video data include processing the video data, with a convolutional neural network model, to generate the depth maps for the frames of the video data.

In a fifth implementation, generating the dense semantic point cloud includes processing the video data, with a semantic segmentation model, to generate the dense semantic point cloud.

In a sixth implementation, determining the dense semantic overhead view of the location associated with the accident includes processing the dense semantic point cloud, with a voxelization model, to determine the dense semantic overhead view of the location associated with the accident.

In a seventh implementation, determining the dense semantic overhead view of the location associated with the accident includes quantizing the dense semantic point cloud into voxels, wherein each voxel includes points of the dense semantic point cloud associated with a respective region of the dense semantic point cloud; and determining the dense semantic overhead view based on the voxels.

In an eighth implementation, projecting the second vehicle onto the dense semantic overhead view to provide the trajectory of the second vehicle in the dense semantic overhead view includes processing the video data, with an object detection model, to determine bounding boxes of the second vehicle; processing the bounding boxes, with a multiple object tracking model, to determine the trajectory of the second vehicle; and providing the trajectory of the second vehicle in the dense semantic overhead view.

In a ninth implementation, augmenting the dense semantic overhead view with the trajectory of the second vehicle, with the additional data to generate the final overhead view includes mapping satellite coordinates to the dense semantic overhead view, and replacing the dense semantic overhead view with the satellite coordinates to generate an overhead satellite view as the final overhead view.

In a tenth implementation, augmenting the dense semantic overhead view with the trajectory of the second vehicle, with the additional data to generate the final overhead view includes determining a road name of the location associated with the accident, identifying a road associated with the road name in the dense semantic overhead view, and presenting the road name on the road in the dense semantic overhead view.

In an eleventh implementation, augmenting the dense semantic overhead view with the trajectory of the second vehicle, with the additional data to generate the final overhead view includes calculating a speed of the second vehicle and a distance of the second vehicle from one or more other vehicles, and presenting the speed and the distance of second vehicle in the dense semantic overhead view.

In a twelfth implementation, the video data further includes video captured of the location by one or more cameras located at the location.

In a thirteenth implementation, generating the sparse point cloud includes selecting particular points in each frame of the video data based on gradients of pixel intensities in the frame; utilizing the particular points in consecutive frames of the video data to estimate a camera pose in every frame of the video data, with respect to a camera position in a first frame of the video data; and generating the sparse point cloud based on utilizing the particular points.

In a fourteenth implementation, generating the depth maps for the frames of the video data includes generating predicted depth maps for the frames of the video data with a convolutional neural network model, and refining the predicted depth maps with a direct sparse odometry model to generate the depth maps for the frames of the video data.

In a fifteenth implementation, generating the dense semantic point cloud includes assigning semantic labels to pixels of the frames of the video data, and utilizing corresponding semantic labels with the dense point cloud to generate the dense semantic point cloud.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device and from a vehicle device of a first vehicle, video data for video captured of a location associated with an accident associated with a second vehicle;
   generating, by the device and based on the video data, a point cloud;
   determining, by the device and based on the point cloud, an overhead view of the location associated with the accident;
   projecting, by the device, bounding boxes of the second vehicle onto the overhead view to provide a trajectory of the second vehicle in the overhead view;
   augmenting, by the device, the overhead view with the trajectory of the second vehicle, with additional data, to generate a final overhead view; and
   performing, by the device, one or more actions based on the final overhead view.

2. The method of claim 1, wherein performing the one or more actions comprises one or more of:
   providing the final overhead view for display;
   reporting the accident or poor driving behavior associated with the second vehicle based on the final overhead view;
   scheduling a driver of the first vehicle for a defensive driving course based on the final overhead view;
   causing the second vehicle to be disabled based on the final overhead view;
   providing, to the second vehicle, a warning for a driver of the second vehicle based on the final overhead view; or
   providing information about the second vehicle to an insurer of the second vehicle based on the final overhead view.

3. The method of claim 1, wherein the point cloud is a dense semantic point cloud, and wherein generating, by the device and based on the video data, the dense semantic point cloud comprises:
   processing, by the device, a dense point cloud and the video data, with a semantic segmentation model, to generate the dense semantic point cloud.

4. The method of claim 3, wherein the dense point cloud is generated based on utilizing one or more depth maps with a sparse point cloud.

5. The method of claim 4, wherein the one or more depth maps are depth maps for frames of the video data, and
   wherein the depth maps are generated based on processing, by the device, the video data, with a convolutional neural network model, to generate the depth maps for the frames of the video data.

6. The method of claim 4, wherein the sparse point cloud is associated with the location associated with the accident, and
   wherein the sparse point cloud is generated based on processing, by the device, the video data, with a simultaneous localization and mapping model, to generate the dense semantic point cloud.

7. The method of claim 1, wherein the overhead view is a semantic overhead view, and wherein determining the semantic overhead view comprises:
   processing the point cloud, with a voxelization model, to determine the semantic overhead view.

8. A device, comprising:
   one or more processors configured to:
   receive, from a vehicle device of a first vehicle, video data for video captured of a location associated with an accident associated with a second vehicle;
   process the video data, with a first model, to generate a semantic point cloud;
   process the semantic point cloud, with a second model, to determine a semantic overhead view of the location associated with the accident;
   project a plurality of images associated with second vehicle onto the semantic overhead view to provide a trajectory of the second vehicle in the semantic overhead view; and
   augment the semantic overhead view, with the trajectory of the second vehicle, with additional data, to generate a final overhead view.

9. The device of claim 8, wherein the one or more processors, to process the semantic point cloud, with the second model, to determine the semantic overhead view, are configured to:

quantize the semantic point cloud into voxels,
wherein each voxel includes points of the semantic point cloud associated with a respective region of the semantic point cloud; and
determine the semantic overhead view based on the voxels.

10. The device of claim 8, wherein the plurality of images associated with the second vehicle comprise bounding boxes of the second vehicle, and
wherein the one or more processors, to project the plurality of images associated with the second vehicle onto the semantic overhead view to provide the trajectory of the second vehicle in the semantic overhead view, are configured to:
process the video data, with an object detection model, to determine the bounding boxes of the second vehicle;
process the bounding boxes, with a multiple object tracking model, to determine the trajectory of the second vehicle; and
include the trajectory of the second vehicle in the semantic overhead view.

11. The device of claim 8, wherein the one or more processors, to augment the semantic overhead view with the trajectory of the second vehicle, with the additional data to generate the final overhead view, are configured to:
map satellite coordinates to the semantic overhead view; and
replace the semantic overhead view with an overhead satellite view based on the satellite coordinates to generate the final overhead view.

12. The device of claim 8, wherein the additional data comprises one or more of:
one or more satellite images,
data identifying one or more road names,
data identifying one or more vehicle speeds, or
data identifying one or more vehicle distances.

13. The device of claim 8, wherein the one or more processors, to augment the semantic overhead view with the trajectory of the second vehicle with the additional data to generate the final overhead view, are configured to:
calculate a speed of the second vehicle and one or more respective distances of the second vehicle from one or more other vehicles; and
present the speed and the one or more respective distances of the second vehicle in the final overhead view.

14. The device of claim 8, wherein the video data includes video captured of the location by a plurality of cameras associated with the location.

15. A non-transitory computer-readable medium storing instructions, the instructions comprising:
one or more instructions that, when executed by one or more processors, cause the one or more processors to:
receive, from a vehicle device of a first vehicle, video data for video captured of a location associated with an accident associated with a second vehicle;
process the video data, with a segmentation model, to generate a point cloud;
process the point cloud, with a voxelization model, to determine an overhead view of the location associated with the accident;
project a plurality of images of the second vehicle onto the overhead view to provide a trajectory of the second vehicle in the overhead view; and
perform one or more actions based on the overhead view.

16. The non-transitory computer-readable medium of claim 15, wherein the one or more instructions, that cause the one or more processors to perform the one or more actions, cause the one or more processors to one or more of:
provide the overhead view for display;
report the accident or poor driving behavior associated with the second vehicle based on the overhead view;
schedule a driver of the first vehicle for a defensive driving course based on the overhead view;
cause the second vehicle to be disabled based on the overhead view;
provide, to the second vehicle, a warning for a driver of the second vehicle based on the overhead view;
provide information about the second vehicle to an insurer of the second vehicle based on the overhead view; or
modify one or more of the segmentation model or the voxelization model based on the overhead view.

17. The non-transitory computer-readable medium of claim 15, wherein the instructions further comprise:
one or more instructions that, when executed by the one or more processors, cause the one or more processors to:
augment the overhead view with the trajectory of the second vehicle, with additional data, to generate a final overhead view.

18. The non-transitory computer-readable medium of claim 15, wherein the one or more instructions, that cause the one or more processors to process the video data, cause the one or more processors to:
utilize an object detection model to detect objects in frames of the video data; and
obtain, for the frames of the video data, respective bounding boxes and classes for the detected object s.

19. The non-transitory computer-readable medium of claim 15, wherein the one or more instructions, that cause the one or more processors to process the video data, cause the one or more processors to:
generate depth maps for frames of the video data; and
generate, based on the depth maps and a sparse point cloud, a dense point cloud;
wherein the point cloud is generated based on the video data and the dense point cloud.

20. The non-transitory computer-readable medium of claim 15, wherein the segmentation model is a semantic segmentation model and the point cloud is a semantic point cloud, and
wherein the one or more instructions, that cause the one or more processors to process the video data, with the semantic segmentation model, to generate the semantic point cloud, cause the one or more processors to:
assign semantic labels to pixels of frames of the video data; and
utilize corresponding semantic labels with a dense point cloud to generate the semantic point cloud.

* * * * *